Figure 1:
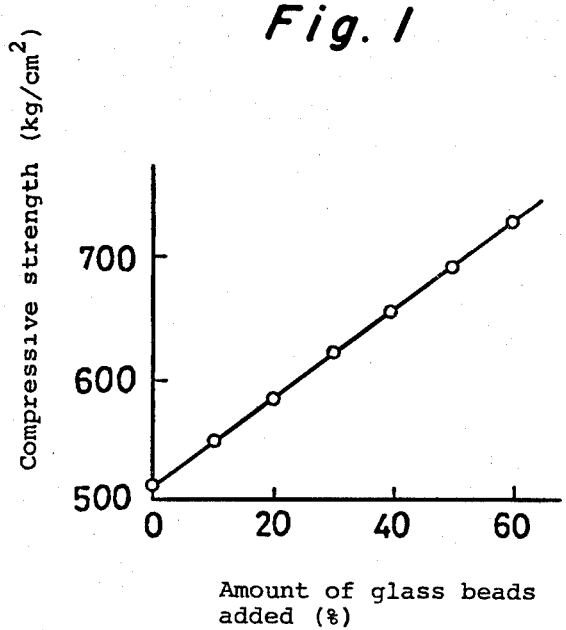

United States Patent [19]

Ishida et al.

[11] 4,451,542
[45] May 29, 1984

[54] CELL WITH GASKET COMPRISING GLASS BEADS

[75] Inventors: Osamu Ishida; Yoshio Uetani; Seiichi Matsushima, all of Osaka, Japan

[73] Assignee: Hitachi Maxell, Ltd., Osaka, Japan

[21] Appl. No.: 328,665

[22] Filed: Dec. 8, 1981

[30] Foreign Application Priority Data

Dec. 8, 1980 [JP] Japan .............................. 55-172891

[51] Int. Cl.$^3$ .................................................. H01M 2/08
[52] U.S. Cl. ............................... 429/174; 429/185; 429/172
[58] Field of Search ............... 429/172, 174, 180, 185; 501/34; 523/219, 177

[56] References Cited

U.S. PATENT DOCUMENTS

| | | | |
|---|---|---|---|
| 2,610,922 | 9/1952 | Beck | 501/34 |
| 2,713,286 | 7/1955 | Taylor | 501/34 |
| 2,939,797 | 6/1960 | Rindone | 501/34 |
| 3,560,074 | 2/1971 | Searight et al. | 501/34 |
| 4,060,671 | 11/1977 | Vandervelden | 429/174 |
| 4,157,325 | 6/1979 | Charles et al. | 523/219 |
| 4,166,157 | 8/1979 | McCormick | 429/174 |
| 4,185,000 | 1/1980 | Gebauer et al. | 523/219 |
| 4,192,576 | 3/1980 | Tung et al. | 501/34 |
| 4,362,566 | 12/1982 | Hunter et al. | 523/219 |

FOREIGN PATENT DOCUMENTS

| | | | |
|---|---|---|---|
| 53-57436 | 5/1978 | Japan | 429/185 |
| 53-140397 | 12/1978 | Japan | 523/219 |
| 55-16345 | 2/1980 | Japan | 429/185 |
| 55-100650 | 7/1980 | Japan | 429/174 |

Primary Examiner—Brian E. Hearn
Assistant Examiner—Stephen J. Kalafut
Attorney, Agent, or Firm—Birch, Stewart, Kolasch & Birch

[57] ABSTRACT

A cell comprising a positive can and a negative collector fitted in the opening of the positive can, a gasket being set in the space between the positive can and the negative collector to prevent the leakage of liquid material from the cell, characterized in that the gasket is made of a synthetic resin composition comprising glass beads. The cell is much improved in its leak-proof propertie.

9 Claims, 3 Drawing Figures

CELL WITH GASKET COMPRISING GLASS BEADS

The present invention relates to a cell improved in its leak-proof property. More particularly, it relates to a cell provided with a synthetic resin gasket comprising glass beads, which has an excellent leak-proof property.

In conventional cells, sealing is usually effected by setting a gasket made of a synthetic resin into the opening of a positive can and crimping the flange of the positive can inwardly to press the gasket against a negative collector so that the contacting surfaces of the positive can, the gasket and the negative collector closely contact one another to prevent leaking of an electrolyte from the contacting surfaces. However, such a synthetic resin gasket does not have sufficient elasticity for prevention of leakage of the electrolyte, and also the deterioration of its elasticity is caused by adsorption of the electrolyte so that the leak-proof property is lowered.

Many attempts have heretofore been made to overcome the stated drawback. For example, the modification of the shape of the negative collector for improving the leak-proof property has been proposed. Further, for example, the application of a sealant material to the contacting surfaces of the gasket with the positive can and the negative collector has been proposed. However, even these proposals can not provide a satisfying leak-proof property.

Among the proposals as recently made, there is the use of a synthetic resin gasket comprising glass fibers, which is prepared by incorporating the glass fibers into a synthetic resin and molding the resultant composition into a gasket shape. While this gasket is improved in tensile strength and compressive strength, the glass fibers partially project onto the surface of the gasket to deteriorate the smoothness of the surface. Further, an electrolyte permeates the inside of the gasket along the projected glass fibers, whereby the leak-proof property is lowered. Moreover, glass fibers are dispersed unevenly into a synthetic resin and increases its viscosity so that the resulting composition is made inferior in fluidity, while such a composition does not shrink evenly. Thus, the production of gaskets with good size precision is quite difficult.

It has now been found that a cell provided with a gasket made of a synthetic resin composition comprising glass beads can maintain an excellent leak-proof property for a long period of time.

According to this the present invention, there is provided a cell comprising a positive can and a negative collector fitted in the opening of the positive can, a gasket being set in the space between the positive can and the negative collector to prevent the leakage of liquid material from the cell, characterized in that the gasket is made of a synthetic resin composition comprising glass beads.

The synthetic resin composition of which the gasket is made comprises at least one synthetic resin and glass beads. As the synthetic resin, there may be used a polyamide (e.g. nylon 6, nylon 66, nylon 610, nylon 11, nylon 12), a polyolefin (e.g. polyethylene, polypropylene, ethylene-propylene copolymer) or the like. The kind of synthetic resin may be selected appropriately depending upon the properties of the electrolyte. For example, in an alkaline cell with an alkaline electrolyte, the use of a polyamide, especially nylon 11 or nylon 12, is preferred. In an organic electrolyte cell using a non-aqueous solution, it is preferred to employ a polyolefin, especially polypropylene.

The glass beads are micro-spherical particles of glass, which may be prepared, for instance, by blowing glass particles into a flame of high temperature, whereby the particles are melted in a floating state to become spherical due to their own surface tension. They are of true spherical shape, smooth surface and extremely small particle size.

The glass beads have usually an average particle size of 2 to 60 $\mu$m. When the particle size is smaller, the production of the glass beads is difficult, and further the glass beads are apt to cohere one to another on treatment with a coupling agent. When the particle size is larger, the glass beads become linked together in the gasket to cause leakage of the electrolyte. Further, by the pressure applied on sealing, the glass beads are apt to be broken to lose their packing function. Furthermore, the fluidity of the synthetic resin composition is lowered on molding of the gasket.

Though the composition of glass for the glass beads is not specifically limited, the one of non-alkali glass (E-glass) is preferable. Also, the glass beads are preferably surface-treated with a coupling agent such as a silane coupling agent (e.g. aminosilane, glycidosilane, acrylsilane) or a titanate coupling agent (e.g. isopropyl triisostearoyl titanate, isopropyl tridodecylbenzenesulfonyl titanate, isopropyl tris(dioctyl pyrophosphate) titanate). Specific examples of the glass beads as commercially available include Toshiba Glass Beads (manufactured by Toshiba Ballotini Co., Ltd.).

When incorporated into a synthetic resin, the glass beads show a good dispersibility due to the bearing effect based on their spherical shape. Further, they serve to improve the fluidity of the synthetic resin composition, and the smooth flow of such composition into a mold can be attained. As their surfaces are smooth, the increase of the viscosity in the synthetic resin composition is relatively small, and a comparatively large amount of such a composition can be filled in a mold.

The amount of the glass beads in the synthetic resin composition may be usually from 5 to 50% by weight, preferably from 20 to 40% by weight. When the amount is smaller, the desired technical effect is not achieved. When the amount is larger, the leakage routes of an electrolyte are formed in the resulting gasket due to the mutual contact of the glass beads.

Incorporation of the glass beads into the synthetic resin is preferably carried out when the synthetic resin is in a melt state. The resulting mixture may be cooled and then pelletized for storage. Preparation of the gasket by the use of such pellets is normally accomplished by injection molding.

The gasket made of the synthetic resin composition is improved in tensile strength, flexural strength, and especially in compressive strength, and have an increased elasticity so that efficient sealing with a high clamping pressure is possible. As a result, the contacting surfaces of the positive can, the gasket and the negative collector are tight, and such a state can be maintained for a long period of time. The leak-proof property of the resulting cell is thus remarkably improved. Further, such a gasket shows a lower liquid absorbing property than that comprising no glass beads. As glass beads are less linked together in the gasket and further less projected to the gasket surface, such a gasket has a smooth surface and is free from the absorption of an electrolyte internally.

Thus, the elasticity of the gasket is hardly affected. Furthermore, since glass beads are isotropic in shape, the gasket shows less deformation on shrinkage and has an evenly dispersed stress. Therefore, the gasket can be easily molded with high size precision and is scarcely broken by stress.

In the case where a gasket is prepared by the use of a synthetic resin composition comprising nylon 11 and glass beads of 30 μm in average particle size, the relationship between the compressive strength of the gasket and the amount of the glass beads employed is shown in FIG. 1 of the accompanying drawings, from which it may be understood that the compressive strength of the gasket is enhanced with the increase of the amount of the glass beads.

Practical and presently preferred embodiments of the present invention are illustratively shown in the following Examples and Comparative Examples, wherein part(s) and % are by weight unless otherwise indicated.

Figure 2:
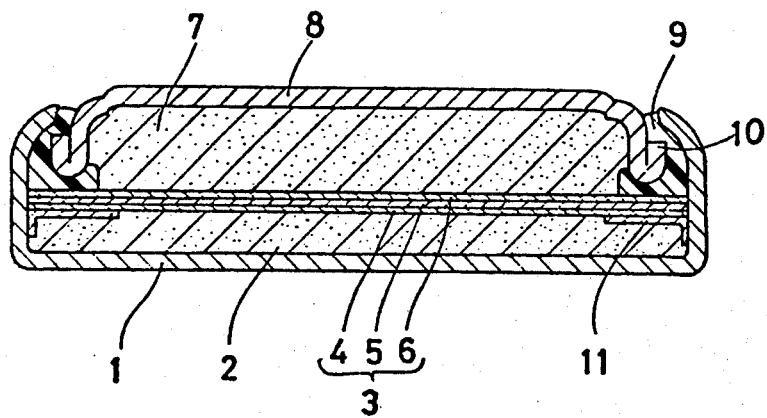
Figure 3:
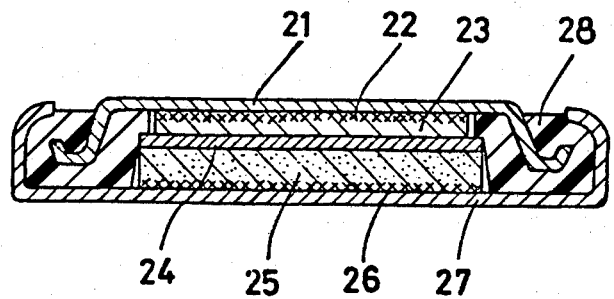

FIG. 2 represents an alkaline cell of button type implementing the gasket of the present invention; and FIG. 3 represents an organic electrolyte cell implementing the gasket of the present invention.

Examples 1 to 18 and Comparative Examples 1 to 3

By the use of a synthetic resin composition comprising glass beads as shown in Table 1, annular gaskets of L-letter shape in cross-section with an outer diameter of 11.1 mm, a diameter of the portion to be in contact with a positive can of 10.1 mm and a height of 1.18 mm were prepared by injection molding. Each of these gaskets was fitted into the peripheral part of a negative collector. Using such a combination of the gasket and the negative collector, an alkaline cell of button type as shown in FIG. 2 of the accompanying drawings was assembled in the following manner:

A portion of an electrolyte was poured into the bottom part of a positive can (1). Into the positive can (1), a positive mix (2) was inserted. On the positive mix (2), there was placed a separator (3) comprising a microporous polypropylene film (4), a cellophane film (5) and a vinylon-rayon mixed paper sheet (6). With the positive can (1), the negative collector (8) containing a negative electrode mix (7) comprising amalgamated zinc as a negative active material and sodium polyacrylate and the remaining portion of the electrolyte was engaged. Then, the flange of the positive can (1) was crimped inwardly to press the gasket (9) against the negative collector (8) to seal the opening, thereby assembling a button type alkaline cell.

As the electrolyte for the above cell, there was used an aqueous solution of potassium hydroxide (35%) containing zinc oxide in a concentration of 5.2%. The negative collector (8) was prepared by the use of a clad plate comprising a steel layer, a nickel layer on the outside surface and a copper layer on the inside surface and formed into a shape having a peripheral lappet portion (10) by drawing. The positive can (1) was made of a nickel plated iron plate. The positive mix (2) was a mixture of silver(I) oxide (150 parts) and graphite (10 parts) molded in one piece with a stainless steel annular base plate (11) under a pressure of 5 t/cm². Each cell had a button shape with a diameter of 11 mm and a thickness of 3.0 mm. On the contact surfaces of the gasket (9) with the positive can (1) and the negative collector (8) in the cell, there were interposed a sealant material comprising asphalt pitch (a mixture of asphalt with process oil).

Every 100 pieces of cells thus assembled were stored at a temperature of 80° C. under a relative humidity of 90%, and the number of the cells which produced leakage of the electrolyte was counted. The results are shown in Table 2.

TABLE 1

| Example | Synthetic resin | Glass beads*1 Average particle size (μm) | Amount of addition (%) | Surface treatment*2 |
|---|---|---|---|---|
| 1 | Nylon 11 | 80 | 10 | Applied |
| 2 | Nylon 11 | 30 | 20 | Applied |
| 3 | Nylon 11 | 30 | 30 | Applied |
| 4 | Nylon 11 | 30 | 40 | Applied |
| 5 | Nylon 11 | 30 | 45 | Applied |
| 6 | Nylon 11 | 30 | 60 | Applied |
| 7 | Nylon 11 | 6 | 30 | Applied |
| 8 | Nylon 11 | 50 | 30 | Applied |
| 9 | Nylon 11 | 70 | 30 | Applied |
| 10 | Nylon 11 | 30 | 30 | Not applied |
| 11 | Nylon 12 | 30 | 10 | Applied |
| 12 | Nylon 12 | 30 | 20 | Applied |
| 13 | Nylon 12 | 30 | 30 | Applied |
| 14 | Nylon 12 | 30 | 40 | Applied |
| 15 | Nylon 12 | 30 | 50 | Applied |
| 16 | Nylon 12 | 6 | 30 | Applied |
| 17 | Nylon 12 | 50 | 30 | Applied |
| 18 | Nylon 12 | 30 | 30 | Not applied |
| Comparative | | | | |
| 1 | Nylon 11 | — | — | — |
| 2 | Nylon 11 | — | 43*3 | — |
| 3 | Nylon 12 | — | — | — |

Note:
*1 For glass beads, non-alkali glass type ones were used.
*2 Aminosilane coupling agent was used.
*3 Glass fibers having a filament diameter of 13 μ and a length of 300 μm was used.

TABLE 2

| | Storage period (days) | | | | |
|---|---|---|---|---|---|
| | 5 | 10 | 20 | 30 | 40 |
| Example | | | | | |
| 1 | 0 | 15 | 63 | 100 | 100 |
| 2 | 0 | 0 | 12 | 26 | 50 |
| 3 | 0 | 0 | 9 | 21 | 42 |
| 4 | 0 | 0 | 13 | 28 | 55 |
| 5 | 0 | 20 | 70 | 100 | 100 |
| 6 | — | — | — | — | —*1 |
| 7 | 0 | 0 | 11 | 22 | 45 |
| 8 | 0 | 30 | 80 | 100 | 100 |
| 9 | 8 | 52 | 100 | 100 | 100 |
| 10 | 0 | 0 | 15 | 35 | 68 |
| 11 | 0 | 14 | 60 | 100 | 100 |
| 12 | 0 | 0 | 12 | 25 | 48 |
| 13 | 0 | 0 | 8 | 20 | 40 |
| 14 | 0 | 0 | 12 | 24 | 53 |
| 15 | 0 | 18 | 70 | 100 | 100 |
| 16 | 0 | 0 | 11 | 18 | 42 |
| 17 | 0 | 30 | 80 | 100 | 100 |
| 18 | 0 | 0 | 16 | 40 | 74 |
| Comparative | | | | | |
| 1 | 0 | 58 | 100 | 100 | 100 |
| 2 | 2 | 27 | 76 | 100 | 100 |
| 3 | 0 | 55 | 100 | 100 | 100 |

Note:
*1 At the time of the sealing, the gasket produced cracks and could not be assembled into a cell.

As shown in Table 2, the cell of the invention showed a favorable leak-proof property, particularly when the amount of the glass beads was in a range of 20 to 40%. With a larger particle size of the glass beads, the leak-proof property of the cell lowered. In the case where the surface treatment was not effected, the improvement in liquid-proof property was smaller in comparison with the case where the surface treatment with a coupling agent was effected. With regard to nylon 11, the increase of the amount of the glass beads to about 60% made the gasket fragile and caused cracks in the gasket on the sealing so that the gasket became unsuitable for assembly into a cell. Besides, it was understood that when the glass fibers were used in place of the glass beads, the leak-proof property of the cell was remarkably lowered.

EXAMPLES 19 to 26 and Comparative Example 4

Using a synthetic resin composition comprising glass beads as shown in Table 3, an annular gasket was insert-molded by injection molding on the peripheral part of a negative collector. Using such combination of the gasket and the negative collector, an organic electrolyte cell as shown in FIG. 3 of the accompanying drawings was assembled in the following manner:

A lithium disc having a diameter of 14 mm and a thickness of 0.25 mm was pressed into a stainless steel net (22) spot-welded to the inner surface of the negative collector (21) to make a negative electrode mix (23). Then, a separator (24) comprising a non-woven fabric of polypropylene was placed therein, and a majority portion of the electrolyte was poured therein. A positive mix (25) of 16 mm in diameter and 0.5 mm in thickness, prepared by molding a mixture of manganese dioxide (100 parts), graphite (10 parts) and polytetrafluoroethylene (2 parts) in one piece with a stainless steel net (26) under a pressure of 5 t/cm$^2$, was placed thereon with its net side upward. The remaining portion of the electrolyte was dropwise added thereto. Then, a positive can (27) was capped thereon. The opening of the positive can (27) was inwardly tightened, and the gasket (28) made by insert-molding on the negative collector (21) was brought into pressure contact with the positive can (27) and the negative collector (21) to seal up the cell assembly. Then, the assembly was turned upside down to obtain an organic electrolyte cell.

As the electrolyte for above the cell, there was used a solution of lithium perchlorate in a mixed solvent of propylene carbonate and 1,2-dimethoxyethane in a weight proportion of 35:65 at a concentration of 0.5 mol/liter. As the negative collector (21) and the positive can (27), there were used those made of a nickel-stainless steel clad plate. Each cell had a button shape with a diameter of 20 mm and a thickness of 1.6 mm.

Every 100 pieces of cells thus assembled were stored at a temperature of 80° C. under a relative humidity of 15% and the number of the cells which produced leakage of the electrolyte was counted. The results are shown in Table 4.

TABLE 3

| | Synthetic resin | Glass beads*1 | | |
| --- | --- | --- | --- | --- |
| | | Average particle size (μm) | Amount of addition (%) | Surface treatment*2 |
| Example | | | | |
| 19 | Polypropylene | 30 | 10 | Applied |
| 20 | Polypropylene | 30 | 20 | Applied |
| 21 | Polypropylene | 30 | 30 | Applied |
| 22 | Polypropylene | 30 | 40 | Applied |
| 23 | Polypropylene | 30 | 45 | Applied |
| 24 | Polypropylene | 6 | 30 | Applied |

TABLE 3-continued

| | Synthetic resin | Glass beads*1 | | |
| --- | --- | --- | --- | --- |
| | | Average particle size (μm) | Amount of addition (%) | Surface treatment*2 |
| 25 | Polypropylene | 50 | 30 | Applied |
| 26 | Polypropylene | 30 | 30 | Not Applied |
| Comparative | | | | |
| 4 | Polypropylene | — | — | — |

Note:
*1For glass beads, non-alkali glass beads were used.
*2Aminosilane coupling agent was used.

TABLE 4

| | Storage period (days) | | | | |
| --- | --- | --- | --- | --- | --- |
| | 20 | 40 | 60 | 80 | 100 |
| Example | | | | | |
| 19 | 0 | 0 | 2 | 5 | 10 |
| 20 | 0 | 0 | 0 | 0 | 4 |
| 21 | 0 | 0 | 0 | 0 | 2 |
| 22 | 0 | 0 | 0 | 0 | 4 |
| 23 | 0 | 0 | 3 | 8 | 15 |
| 24 | 0 | 0 | 0 | 0 | 2 |
| 25 | 0 | 5 | 5 | 10 | 15 |
| 26 | 0 | 0 | 0 | 3 | 7 |
| Comparative | | | | | |
| 4 | 0 | 12 | 16 | 21 | 27 |

As shown in Table 4, the cell of the invention showed a favorable leak-proof property especially when the amount of the glass beads was in a range of 20 to 40%. With a larger particle size of the glass beads, the leak-proof property of the cell lowered. In the case where the surface treatment was not effected, the improvement in leak-proof property was smaller in comparison with the case where the surface treatment with a coupling agent was effected.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cell comprising in combination:
   a positive can having an opening defined by a lateral circumferential edge for receiving an electrolyte,
   a negative collector having a peripheral portion fitted in said opening of said positive can defining a space between said peripheral portion and said lateral circumferential edge of said positive can, and
   a gasket means set in said space between said lateral edge of said positive can and said peripheral portion of said negative collector so as to prevent the leakage of said electrolyte from said cell, said gasket comprising a synthetic resin composition including galss beads having an average particle size of 2 to 60 μm in an amount of from 5 to 50% by weight of said composition.

2. The cell according to claim 1, wherein said cell is an alkaline cell and said sythentic resin is a polyamide.

3. A cell according to claim 2, wherein said polyamide is nylon.

4. The cell according to claim 2, wherein said electrolyte is an alkaline electrolyte.

5. The cell according to claim 1, wherein said cell is an organic electrolyte cell and said synthetic is a polyolefin.

6. The cell according to claim 5, wherein said polyolefin is polypropylene.

7. The cell according to claim 5, wherein said electrolyte is an organic electrolyte.

8. The cell according to claim 1, wherein the content of said glass beads is from 20 to 40% by weight.

9. The cell according to claim 1, wherein said glass beads are treated with a coupling agent.

* * * * *